US012058205B1

(12) United States Patent  
Augé et al.

(10) Patent No.: US 12,058,205 B1  
(45) Date of Patent: Aug. 6, 2024

(54) OPPORTUNISTIC CLIENT LOCATING FOR FAST EDGE SERVER ASSOCIATION

(71) Applicant: Cisco Technology, Inc., San Jose, CA (US)

(72) Inventors: Jordan Augé, Saint-Cyr-l'Ecole (FR); Mauro Sardara, Issy les Moulineaux (FR); Michele Papalini, Issy les Moulineaux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/363,357

(22) Filed: Aug. 1, 2023

(51) Int. Cl.  
*H04L 67/1021* (2022.01)  
*H04L 67/1008* (2022.01)

(52) U.S. Cl.  
CPC ...... *H04L 67/1021* (2013.01); *H04L 67/1008* (2013.01)

(58) Field of Classification Search  
CPC .................. H04L 67/1021; H04L 67/1008  
See application file for complete search history.

(56) References Cited

U.S. PATENT DOCUMENTS

| | | | |
|---|---|---|---|
| 7,103,651 B2 * | 9/2006 | Bohannon | H04L 9/40 709/248 |
| 9,495,338 B1 * | 11/2016 | Hollis | G06F 40/143 |
| 10,270,878 B1 * | 4/2019 | Uppal | H04L 45/02 |
| 10,868,750 B1 * | 12/2020 | Yang | H04L 43/16 |
| 11,533,359 B1 | 12/2022 | Thomason | |
| 11,916,995 B1 * | 2/2024 | Thomason | H04L 67/02 |
| 11,924,268 B1 * | 3/2024 | Thomason | H04L 67/02 |
| 2002/0038360 A1 * | 3/2002 | Andrews | H04L 67/1006 709/238 |
| 2003/0101278 A1 * | 5/2003 | Garcia-Luna-Aceves | H04L 67/101 709/240 |
| 2009/0113024 A1 * | 4/2009 | Verma | H04L 69/329 709/219 |
| 2010/0125626 A1 * | 5/2010 | Lucas | H04L 67/101 709/203 |
| 2010/0153540 A1 * | 6/2010 | Li | H04L 41/12 709/224 |
| 2012/0233308 A1 * | 9/2012 | Van De Houten | H04L 43/10 709/224 |
| 2013/0290536 A1 * | 10/2013 | Dutta | G06F 9/5027 709/226 |
| 2017/0207989 A1 * | 7/2017 | Cai | H04L 67/101 |

(Continued)

*Primary Examiner* — Alina A Boutah  
(74) *Attorney, Agent, or Firm* — Baker Botts L.L.P.

(57) ABSTRACT

The present disclosure describes systems and methods for associating a client device with an edge server. The method includes receiving by each of a plurality of cloud servers a signal from a client device requesting a resource provided by the plurality of cloud servers. Each of the cloud servers then calculates a distance between each cloud server and the client device, and an approximate location of the client device may be determined based on the calculated distance and the known location of the cloud servers. Using the approximate location of the client device, at least one of a plurality of edge servers that are located within a predetermined distance of the client device is identified by the cloud server, and the cloud server or client device may choose one of the identified edge servers through which the client device may be associated to communicate with the cloud server.

20 Claims, 5 Drawing Sheets

(56) References Cited

U.S. PATENT DOCUMENTS

| | | |
|---|---|---|
| 2020/0099742 A1* | 3/2020 | Puente Pestaña ... H04L 67/1076 |
| 2020/0110625 A1* | 4/2020 | Warnicke ............ H04L 67/1021 |
| 2020/0382581 A1 | 12/2020 | Campbell et al. |
| 2021/0136142 A1* | 5/2021 | Dong .................... G06F 9/5094 |
| 2021/0136178 A1* | 5/2021 | Casey ................... G06F 9/5072 |
| 2021/0314391 A1* | 10/2021 | Lee ....................... H04W 48/18 |
| 2022/0006857 A1* | 1/2022 | Sun ..................... H04L 67/1031 |
| 2022/0107848 A1* | 4/2022 | Wang ................. H04L 67/1004 |
| 2023/0176207 A1* | 6/2023 | Kimionis ............. G01S 13/878 |
| | | 455/456.1 |

\* cited by examiner

OPPORTUNISTIC CLIENT LOCATING FOR FAST EDGE SERVER ASSOCIATION

TECHNICAL FIELD

The present disclosure relates generally to a distributed cloud environment that includes a plurality of edge servers and, more particularly, to systems and methods for determining which edge servers to use as a relay for providing resources and/or services to one or more client devices.

BACKGROUND

Organizations in the recent past have increasingly utilized cloud environments to provide some or all their computing needs. The use of a cloud environment provided for massive rewards of visibility, elasticity, agility, flexibility, scale, security, and cost effectiveness. However, organizations have now begun to bring at least some computing back to a more local environment, such as the so-called edge computing environment. The edge computing environment, comprising a plurality of edge servers, allows some computing to be performed closer to the end users or organization while still having some of the benefits of the cloud environment. The edge computing environment overcomes some of the deficiencies of cloud environments, such as bandwidth, latency, regulatory, and/or privacy concerns. However, selecting which edge server or node to offload cloud resources to is not a trivial matter, especially when the resources are related to real-time communications, such as live media distribution and/or a real-time video conferencing application.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems and components depicted in the accompanying figures are not to scale, and components within the figures may be depicted not to scale with each other.

DESCRIPTION OF EXAMPLE EMBODIMENTS

Overview

Figure 1:
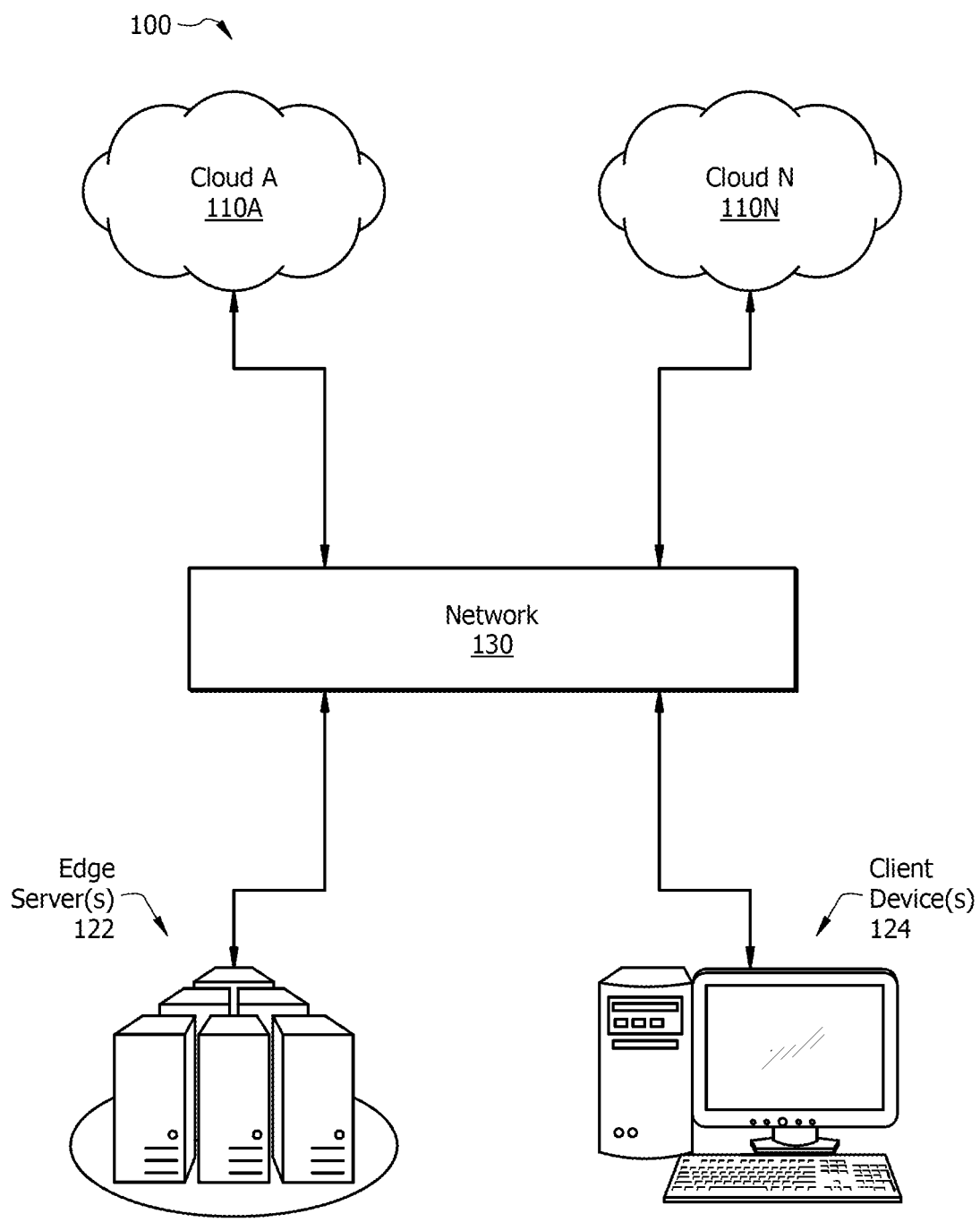
FIG. 1 illustrates a system diagram of a network architecture for performing one or more embodiments.

One or more embodiments include a method for associating a client device with an edge server. Each of a plurality of cloud servers receives a signal from the client device requesting a resource provided by the plurality of cloud servers. Each of the plurality of cloud servers uses the signal to calculate the distance between each cloud server and the client device. The cloud servers can then determine the approximate location of the client device based on the calculated distance between each cloud server and the client device. The cloud servers then identify one or more edge servers that are within a predetermined distance of the approximate location of the client device. The cloud server then communicates to the client device the identity of the one or more edge servers that are within the predetermined distance.

This disclosure additionally describes a system that includes a client device, one or more edge servers, and a plurality of cloud servers. Each of the cloud servers further includes one or more processors and one or more computer-readable non-transitory storage media coupled to the one or more processors that stores instructions operable when executed by the one or more processors to cause the system to perform a method. The method includes each of the plurality of cloud servers receiving a signal from the client device requesting a resource provided by the plurality of cloud servers. Each of the plurality of cloud servers uses the signal to calculate the distance between each cloud server and the client device. The cloud servers are then able to determine the approximate location of the client device based on the calculated distance between each cloud server and the client device. The cloud servers then identify the one or more edge servers that are within a predetermined distance of the approximate location of the client device. The cloud server then communicates to the client device the identity of the one or more edge servers that are within the predetermined distance.

This disclosure also describes at least one non-transitory computer-readable storage medium having stored instructions. When the instructions are executed by one or more processors, the instructions cause the processors to receive from each of a plurality of cloud servers, a signal from a client device requesting a resource provided by the plurality of cloud servers. Each of the plurality of cloud servers calculates the distance between the cloud server and the client device using the received signal. From this calculated distance, at least one of the plurality of cloud servers may determine the approximate location of the client device and identify, using the approximate location of the client device, the one or more edge servers that are within a predetermined distance from the client device. Once the one or more edge servers that are within the predetermined distance are identified, the at least one of the plurality of cloud servers communicates the identified one or more edge servers to the client device.

In one or more embodiments, each of the one or more edge servers that are within the predetermined distance is ranked based on its distance from the approximate location of the client device. The location of the one or more edge servers may be determined by probing the one or more edge servers by the plurality of cloud servers to determine an approximate location of the one or more edge servers; alternatively, or in addition, this location may be both stored and retrieved from a database associated with the one or more cloud servers.

Once the edge servers are ranked by the cloud servers, the identity, along with the rank, of the one or more edge servers that are within a predetermined distance from the client device is communicated to the client device. The client device then probes a predetermined number of the edge servers with the highest rank to determine which edge server has the best performance. Once the edge server with the best performance is determined, the client device begins communicating with the cloud server through the determined edge server, which may function as a relay between the client device and the at least one of the plurality of cloud servers.

In one or more embodiments, the distance between each cloud server and the client device is calculated by using the known distance the signal can traverse by the amount of time the signal takes to be received by each of the plurality of cloud servers. This may be based on the distance light travels in a predetermined medium and the amount of time the signal takes to be received. Once the distance is determined, the approximate location of the client device may be determined using the determined distance with trilateration and/or other methods for determining locations, such as triangulation.

Certain systems and methods described herein may allow for choosing an edge server from a plurality of edge servers. The chosen edge server is then utilized, either directly or as a relay, to provide a client device with one or more resources previously provided directly from a cloud server. The systems and methods allow for the edge server to be selected based on the distance between the edge server and an approximate location of the client device. The approximate location of the client device is determined by using the time it takes for a signal that may be unrelated to the client's location to be received by a plurality of cloud servers. Using the known location of the cloud servers and the time-of-flight (TOF) information for the signal, the location of the client device may be triangulated, and those edge devices that are nearest to the determined location are selected. By using this method, the approximate location of the client device may be determined without the client device needing to communicate any location or identifying information, allowing the client device to have some anonymity while still being able to use the nearest edge server to efficiently provide or relay a resource initially hosted by the one or more cloud servers.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

The present disclosure describes an approach that allows for efficiently utilizing available edge servers to provide resources that have previously been provided from cloud environments in a distributed cloud environment. The distributed cloud environment allows an organization to utilize a hybrid combination of traditional cloud servers and edge servers to provide resources and subsequently manage them as a unified system. However, determining which edge servers are best at forwarding and/or providing a resource, especially for real-time applications such as real-time video conferencing applications, remains a challenge. The present disclosure seeks to address this by introducing an optimal method and system for selecting from a plurality of edge servers the edge server nearest a client device based on the approximate location of the client device.

Real-time video conferencing, as well as similar real-time applications, generate significant traffic loads due to the large size of video data. At the same time, because it is real-time, interruptions or delays in traffic are not well tolerated. Leveraging the use of edge servers as relays in a video conferencing system may lead to large bandwidth and computational savings in the cloud. This also allows the cloud servers to be able to serve a larger number of users while guaranteeing a given quality of experience (QoE).

One of the benefits of leveraging edge servers is that traffic from the media bridge (often deployed in the cloud) may be reduced since edge servers act as intermediate media switching nodes (relays), distributing media flows to connected client devices. However, the use of edge servers as relays in real-time media communications is still in its infancy. Determining which edge server to use as a relay may be difficult and/or require obtaining location data, which a client device may not be willing to share for security or privacy reasons.

The present disclosure attempts to overcome these and other issues by having the cloud servers first determine the approximate location of the client device. The approximate location is determined without the client device needing to send sensitive information, including its exact geolocation. The approximate location of the client device is determined based on measuring the time it takes a signal from the client device to be received by a plurality of cloud servers and using this measurement to perform trilateration to obtain an approximate location of the client device. Using the resulting approximate location and the known location of the edge nodes, the edge node that is nearest to the client device may be selected to act as the relay.

The various aspects of the disclosure may be implemented in many different forms and should not be construed as limited to the implementations set forth herein. The disclosure encompasses variations of the embodiments as described herein Like numbers refer to like elements throughout.

FIG. 1 illustrates a system diagram of an example system for providing resources from one or more cloud servers to client devices according to some aspects of the current disclosure. FIG. 1 further illustrates a distributed cloud environment 100. The distributed cloud environment 100 includes a system architecture that includes two or more cloud servers 110A-110N, edge servers 122, and client devices 124. The distributed cloud environment 100 may include more or fewer devices than those shown in FIG. 1. The system further includes a network 130 that connects the cloud servers 110A-110N, edge servers 122, and client devices 124. Each of these modules may be virtual, and/or one or more may be implemented by a stand-alone server or computational device configured to execute one or more stored instructions, such as that described with regards to FIG. 4.

In some examples, the network 130 may include devices housed or located in one or more of the edge servers 122 and client devices 124, and/or the cloud servers 110A-110N. The network 130 may include one or more networks implemented by any viable communication technology, such as wired and/or wireless modalities and/or technologies. The network 130 may include any combination of personal area networks (PANs), local area networks (LANs), campus area networks (CANs), metropolitan area networks (MANs), extranets, intranets, the Internet, short-range wireless communication networks (e.g., ZigBee, Bluetooth), wide area networks (WANs)—both centralized and/or distributed—and/or any combination permutation and/or aggregation thereof. The network 130 may include devices, virtual resources, or other nodes that relay packets from one network segment to another by nodes in the computer network. The network 130 may include multiple devices that utilize the network layer (session layer, transport layer, and/or other layers) in the OSI model for packet forwarding. The network 130 may include various hardware devices, such as routers, switches, gateways, network interfaces (NICs), application specific integrated circuits (ASICs), field-programmable gate arrays (FPGAs), servers, and/or any other type of device. Further, the network 130 may include virtual resources, such as virtual machines (VMs), containers, and/or other virtual resources. Additionally, or alternately, the techniques described herein are applicable to container technology, such as Docker®, Kubernetes®, and so forth.

The one or more cloud servers 110A-110N may include one or more data centers comprising a plurality of cloud servers that are located or hosted externally to the organization. The cloud servers 110A-110N may provide data storage, computing power, or other resources through interaction between one or more cloud servers and client devices 124. The services hosted by the cloud servers are often provided on an on-demand basis, and a variety of tiers of service may be provided that may be reconfigured on demand as needed. This allows the organization to have agility in responding to changing needs and to efficiently use available resources, at least from an economic and energy use perspective.

For example, in a non-limiting example, a cloud server 110A may host a database associated with an underutilized product. However, due to advertising or other reasons, the product becomes popular. With a cloud environment, the organization may quickly reconfigure or purchase additional computing capacity to handle the additional data and interactions with the database. When the product is no longer being used extensively, the extra capacity may easily be removed or re-dedicated to another product as needed. This flexibility is an advantage of cloud environments.

Further, depending on availability or capabilities, an organization may choose to use a plurality of different cloud servers 110A-110N to host various services and/or data in environments that meet geographical needs, security needs, and performance needs. Additionally, with cloud environments, a unified security policy may be more easily implemented. Because of centralization, as well as scale, cloud service providers may devote resources to solving issues that many customers cannot afford and/or do not have the ability to implement locally. However, because the cloud servers 110A-110N may be geographically located far away from the organization and, because cloud installations may be complex and expensive, alternatives to the cloud environment are often needed.

One such alternative is an edge computing environment comprising one or more edge servers 122. Edge servers 122, much like cloud environments, include one or more datacenters, servers, and/or computing devices. However, unlike cloud environments, the edge servers 122 are generally located in an organization's datacenter or in small deployments near potential customers. The one or more edge servers 122 may be physical facilities or buildings located across geographic areas that are designated to store networked services that are part of the network 130. The edge servers 122 may include various networking devices, as well as redundant or backup components and infrastructure for power supply, data communications connections, environmental controls, and various security devices. The edge servers may take the form of one or more computing devices, as described in more detail below with regards to FIG. 4. Generally, the edge servers 122 may provide basic resources, such as processor (CPU), memory (RAM), storage (disk), and networking (bandwidth).

Because the edge servers are often located in an organization's own datacenters or nearer to the end users, they may often provide better latency than that of third-party cloud environments, e.g., 110A, which may only have a limited number of servers providing a resource for a large geographical area. For example, there may be only one or two cloud datacenters or environments, e.g., 110A, providing resources to an entire continent, while edge computing devices might be located in each country or even in each major city. This provides better latency since the communications between client devices 124 and edge servers 122 do not need to travel as far. Further, edge servers 122 often have dedicated high-speed connections to the specific cloud servers 110A-110N, which is different from what a client device 124 typically communicates with. Even if a resource is ultimately provided by a server located in the one or more cloud servers 110A-110N, by having the client device 124 connect to the edge server 122 rather than directly to a cloud server, e.g., 110A, faster provisioning of the resource may occur.

A client device 124 may provide a user, such as an administrator and/or customer, access to one or more resources through the edge server 122 and/or directly from the one more cloud servers 110A-110N. A client device 124 may be any computational device, such as those described with regards to FIG. 4 below. The client device 124 may be connected to the cloud servers 110A-N and/or edge server 122 through the network 130. The client device 124 may be located in the same city or locations as the edge server 122, or may be in a separate geographical location. The client device 124 may be an end-user's device.

In one or more embodiments, the client device 124 is initially connected to one or more cloud servers, e.g., 110A. After some time, the client device 124 is migrated or associated with an edge server 122 in order to provide improved service and/or reduce costs. The method of determining which edge server of a plurality of edge servers 122 to select is described next with regards to FIGS. 2A, 2B, and 3.

Figure 2A:
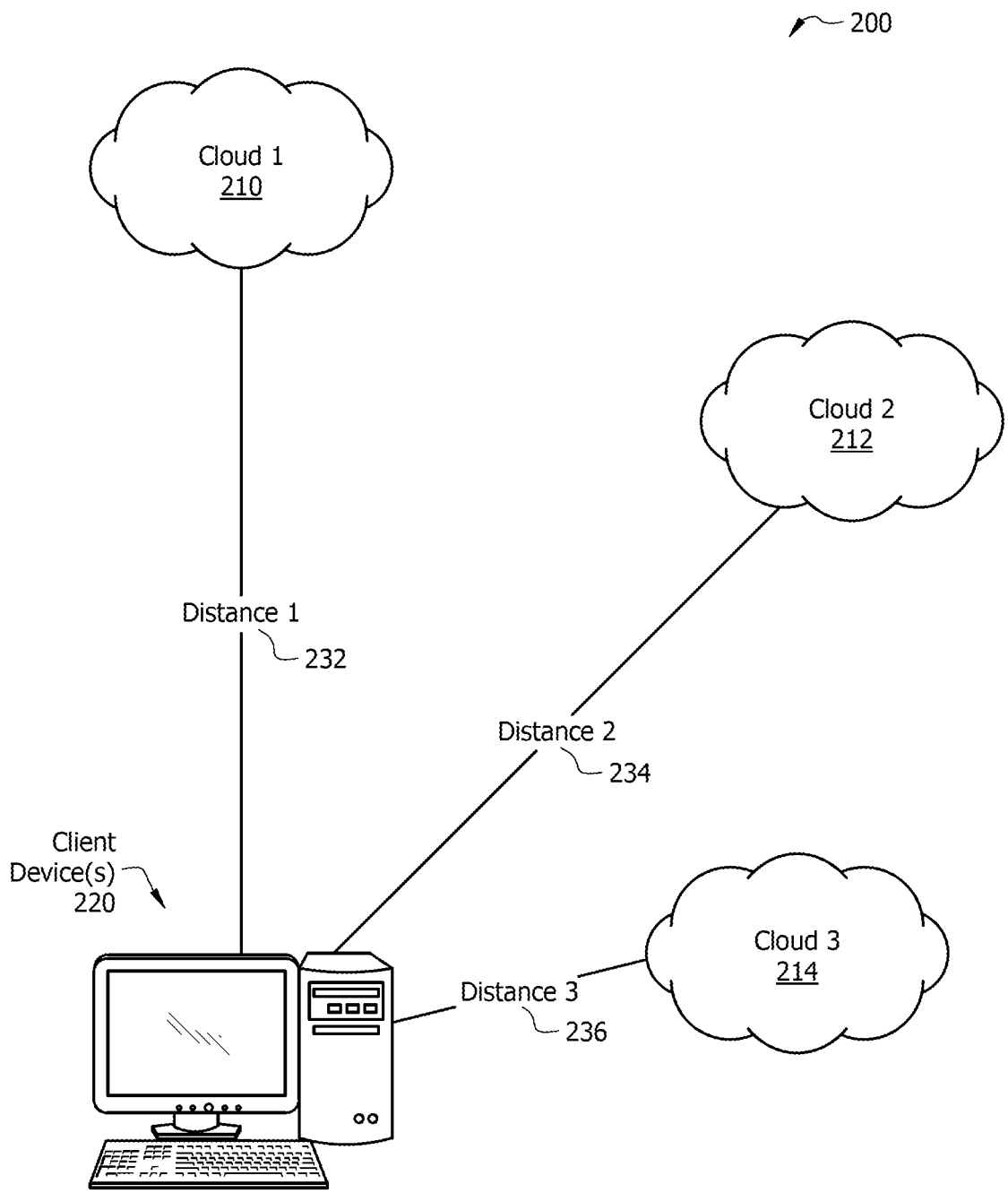
FIG. 2A illustrates an exemplary configuration for determining the location of a client device in accordance with at least one embodiment.

FIG. 2A shows an exemplary configuration for determining the location of a client device. In FIG. 2A, the client device 220 is geographically separate from the cloud servers 210-214 that may provide it with a resource. When the client device 220 initially requests a resource, such as an application, file, or other service hosted by the cloud servers, the client device 220 sends a signal to each of the cloud servers 210-214. Based on the amount of time it takes for the signal from the client device 220 to reach each of the cloud servers 210-214, an approximate distance may be calculated between the client device and that of the cloud servers 210-214.

In general, a signal from the client device 220 to each of the cloud servers, travels a distance that is related to the amount of time that light or an electrical signal takes to traverse a medium of a given length. The distance between the client device 220 and one or more of the cloud servers 210-214 may be calculated using the following formula: $D=T*C$, where T is the amount of time that it takes the signal to arrive at the cloud server, e.g., 210, C is the speed of light in the medium and D is the distance, e.g., 232, between the cloud server, e.g., 210, and the client device 220. The time may be determined by looking at the time stamp on the initial message and comparing it to the system time when the signal is received. Due to such devices as switches and different medium that the real signal may pass through, this may only provide an approximate distance; however, for purposes of determining which edge servers to use, an approximate distance and location is generally sufficient.

As a non-limiting example, if the client device 220 sends a signal to the cloud server 210 and the signal is sent by a light beam or pulses in a vacuum, the distance that the light beam travels may be calculated by multiplying the determined amount of time it takes for the signal to arrive at the cloud server 210 by 299,792,458 msec. For example, in a non-limiting example, suppose that a signal takes 1 millisecond to arrive at a cloud server, a determination may be made that the client device is 300 km away (299,792 m/millisecond*1 millisecond=299,792 m which is approximately 300 km). The speed of the signal is dependent on the material and the speed of light in glass, such as that of fiber optics (approximately 214,000,000 msec) is less than that in a vacuum.

By determining the amount of time, it takes a signal to travel between each of the cloud servers 210-214 and the client device 220, the distance between each may be determined. When the signal is sent to multiple cloud servers, the multiple distances 232-236 may be used to determine the approximate location of the client device. As shown in FIG. 2A, three distances are determined: a first distance 232 between a first cloud server 210 and the client device 220; a second distance 234 between a second cloud server 212 and the client device 220; and a third distance 236 between a third cloud server 214 and the client device 220. Once at least these three distances are determined, using trilateration, multilateration, or other techniques, the approximate location of the client device 220 may be determined using the known location of each of the cloud servers 210-214.

Trilateration (or multilateration) is a method for determining the position coordinates of an object, such as a client device 220, using distances or ranges obtained through time-of-flight (TOF) or time of arrival (TOA) calculations. Once the distance is known, using known algorithms, the position of the object (client device 220) may be determined by finding the point in space where a circle or sphere that has a radius equal to the distance between a cloud server, e.g., 210, and the client device 220 intersects with the circle or sphere from the other cloud servers, e.g., 212 and 214. Other techniques of locating the client device 220, such as, but not limited to, triangulation when the angles between the cloud servers 210-214 and the client device 220 are known, may be used without departing from the disclosure.

Figure 2B:
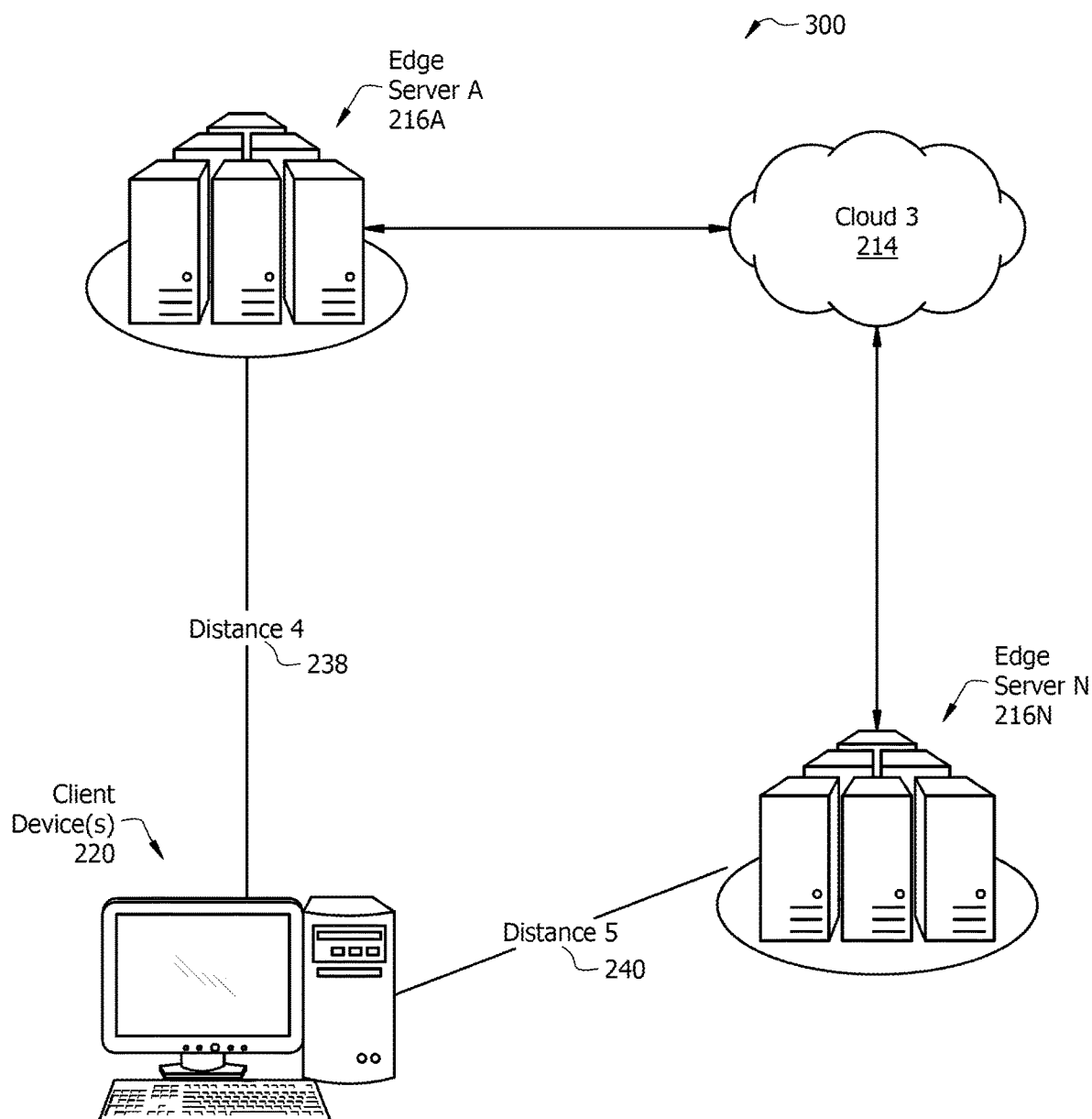
FIG. 2B illustrates an exemplary configuration for determining the nearest edge server in accordance with at least one embodiment.

Once the approximate location of the client device 220 is determined, the cloud server(s) 210-214 that is nearest to the client device 220 may determine one or more edge servers that are within a predetermined distance of the client device 220, as is shown in more detail in FIG. 2B. As shown in FIG. 2B, a plurality of edge servers 216A-216N communicate with a cloud server, such as the third cloud server 214. While only two edge servers (216A and 216N) are shown, the number of edge servers may be any number, and the disclosure is not limited to just the two shown in FIG. 2B. Further, while the third cloud server 214 is shown in FIG. 2B, any of the available cloud servers may be used, and the use of the third cloud server 214 is only for exemplary purposes.

In one or more embodiments, the distance between the edge servers 216A-216N and the client device 220 is determined by the cloud server, e.g., 214. A fourth distance 238 may be determined between edge server 216A and the client device 220, while a fifth distance 240 may be determined between edge server 216N and the client device 220. These distances (fourth 238 and fifth 240) may be determined by using the known location of the edge servers 216A-216N and the approximate position of the client device 220 determined as discussed with regards to FIG. 2B.

Based on the determined distances, e.g., 238 and 240, the edge servers, e.g., 216A-216N, may be ranked and/or eliminated. When an edge server, e.g., 216A, is outside of a predetermined distance it may be eliminated. This predetermined distance may be determined by a user, administrator, developer, or other concerned party. The predetermined distance may also be determined based on the approximate location of the client device 220. For example, a client device 220 that is located in a major city may have a smaller predetermined distance compared to that located in a more rural setting where the average distance to an edge server, e.g., 216A, may be much greater than the average distance to an edge server, e.g., 216N, in an urban environment. Other methods may be used to determine the predetermined distance.

Once the edge servers that are outside of the predetermined distance are eliminated, the remaining subset of edge servers is sent to the client device. Additionally, or alternatively, the remaining edge servers 216A-216N may be ranked by the cloud server based on their distances 238 and 240 from the client device 220. As shown in the example of FIG. 2B, edge server 216N would be given a higher rank then that of edge server 216A. This is because, as can clearly be seen, the fifth distance, 240, is less than that of the fourth distance, 238. By providing both information related to the subset of edge servers, e.g., 216N, and the ranking assigned to the edge servers, e.g., 216N, the client device 220 may make an informed decision on which edge server 216A-216N to use as a relay. In one or more embodiments, the client device 220 may additionally probe each of the edge servers 216A-216N that are in the subset or are of a sufficient rank to determine the best edge server 216A-216N to connect with based on other factor besides distance, such as, but not limited to, latency, network conditions, capacity, speed, and other factors as configured by the application, control plane, system administrator, developer, or other party. The ranking may be based solely on the results of the probing, or it may also consider such things as clustering or grouping of client devices using the same resource as is determined during the mapping. Other criteria may be used to provide a ranking, and the disclosure is not limited to what has been described.

Figure 3:
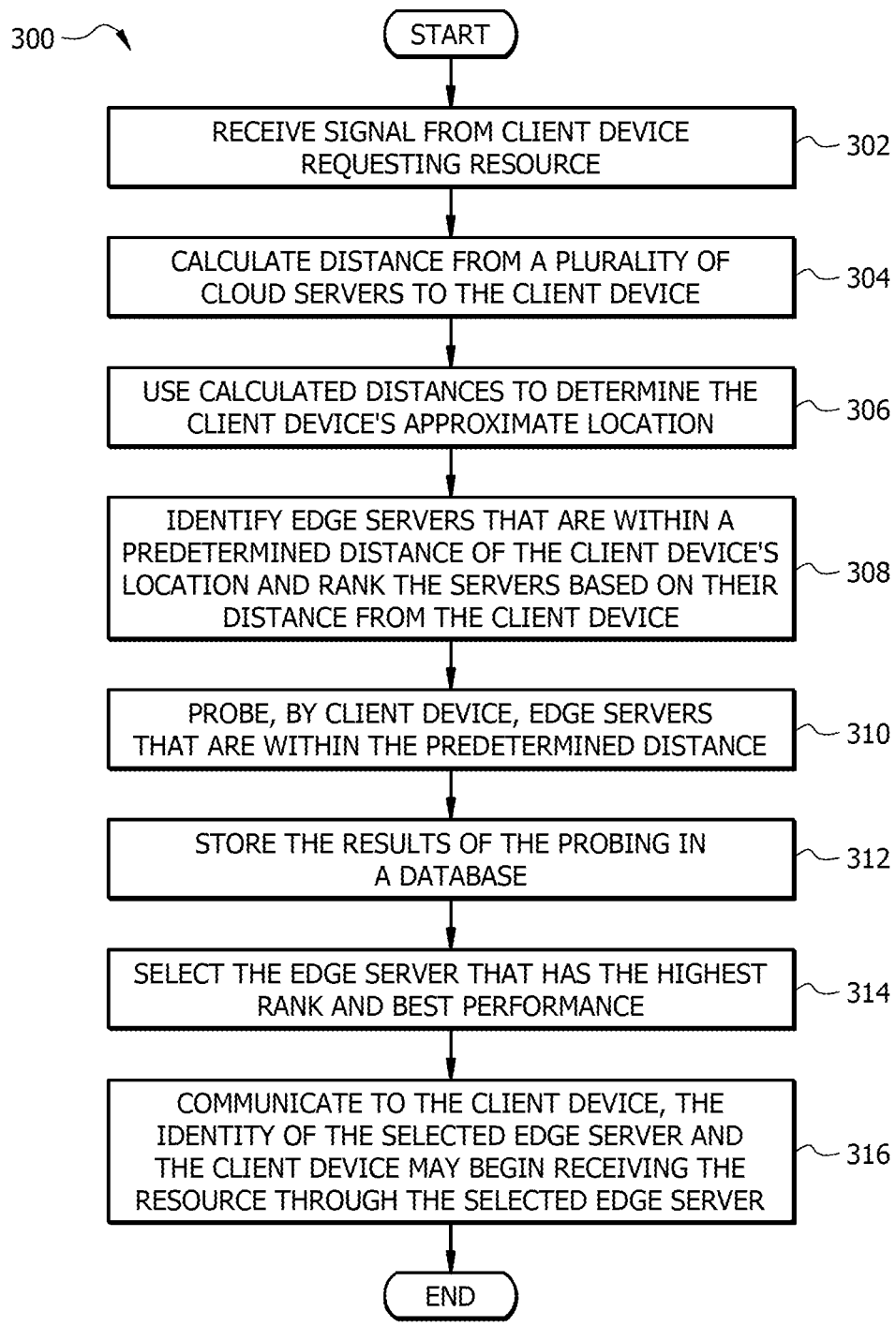
FIG. 3 illustrates a flow diagram of an example method for associating a client device with an edge server in accordance with at least one embodiment.

FIG. 3 illustrates an exemplary method 300 for associating a client device with an edge server in accordance with one or more embodiments.

At step 302, in one or more embodiments, the cloud server, e.g., 110A, such as that described above with regards to FIGS. 1, 2A, and 2B, receives a signal from a client device requesting a resource. As described above, the resource may be data, an application, asset, or resource hosted by the cloud server. The resource may also include a video conferencing application, a video streaming application, Voice over Internet Protocol (VOIP) services, database services, or any other type of resource or service. Additionally, the cloud computing device may host one or more media bridges to provide the resource.

Once the cloud servers receive the signal from the client device in step 302, the method proceeds to step 304. In step 304, the distance between the plurality of cloud servers and the client device is calculated. This is done by using time-of-flight (TOF) calculations on the signals as described in more detail above with respect to FIG. 2A. By analyzing the time it takes the signal to reach each cloud server and multiply it by the speed of light in the appropriate medium, an approximate distance may be determined between each of the cloud servers that receive the signal and the client device.

Once these distances are calculated in step 304, in step 306, the calculated distances are used to determine the client device's approximate location. Depending on the accuracy of the distance determination, the client device's location may be determined. The city, neighborhood, state, country, and/or address of the client device may be determined depending on the accuracy of the distance determination, as well as the number of cloud servers that have received the initial signal. While, in general, this approximate location may not be as accurate as a GPS determination or other known geolocation technics, the location may be sufficiently determined to select an appropriate one or more edge servers. The determination of the client device's approximate location does not require the client device to disclose its exact location or any other identification information; however, such information may be used without departing from the disclosure.

Once the client device's approximate location is determined in step 306, one or more of the cloud servers may identify the edge servers that are within a predetermined distance of the client device's location. The location of the edge servers may be determined prior to receiving the signal from the client device or may be determined after the client device's approximate location is determined using a similar method to that used for the client device in steps 304 and 306. The location of the edge servers may be stored in databases associated with the plurality of cloud servers. The edge servers may, optionally, also be ranked based on their distance from the client device, with the edge server that is estimated to be nearest the client device given the highest rank, while those that are farthest may be given the lowest rank or eliminated when they are outside of a predetermined distance.

Information or identification of those edge servers that are identified to be within the predetermined distance in step 308 is sent to the client device and, in step 310, the client device then probes the identified one or more edge servers. The result of the probing may be stored in a database in step 312 so that if the client device needs to connect to a different edge server for any reason, such as, but not limited to, a first edge server becoming unavailable, a new edge server may be quickly determined from the identified one or more edge servers without repeating steps 302-310, significantly reducing the amount of signaling needed.

Once the results of the probing are stored in step 312, the method proceeds to step 314, where the edge server is selected that has the highest rank as well as best performance as determined by the probing. At least one of the plurality of cloud servers and/or an edge server then communicates to the client device the identity of the selected edge server in step 316. The client device then may begin to receive the resource through the selected edge server. After step 316, the method may end.

Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for associating a client device with an edge server using the particular steps of the method of FIG. 3, this disclosure contemplates any suitable method for choosing a particular edge server or other server to facilitate communication between a client device and a resource or application hosted by a cloud server, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
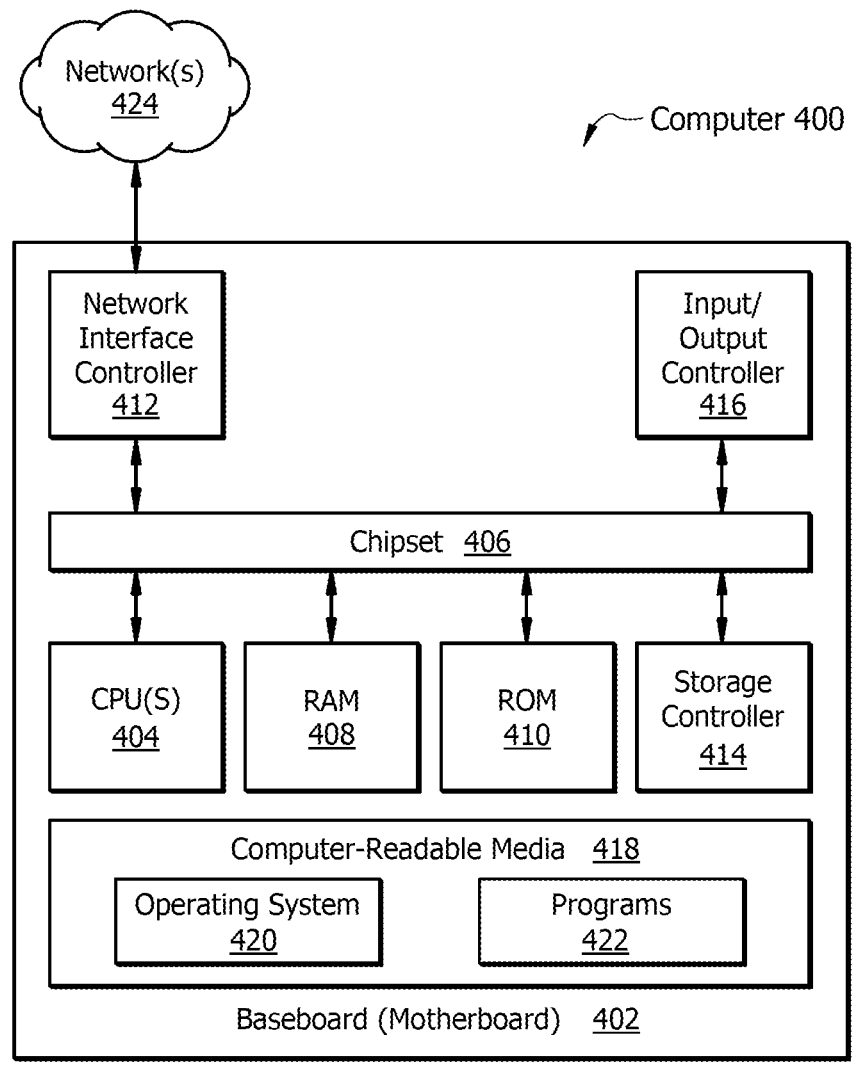
FIG. 4 illustrates a computer architecture diagram shown in an illustrative computer hardware architecture in accordance with at least one embodiment.

FIG. 4 shows an example computer architecture for a device capable of executing program components for implementing the functionality described above. The computer architecture shown in FIG. 4 illustrates any type of computer 400, such as a conventional server computer, workstation, desktop computer, laptop, tablet, network appliance, e-reader, smartphone, or other computing device, and may be utilized to execute any of the software components presented herein. The computer 400 may, in some examples, correspond to any of the devices, such as the edge servers 122 and client devices 124, as well as components of the cloud servers 110A-110N as shown in FIG. 1, and/or any other device described herein, and may comprise personal devices (e.g., smartphones, tables, wearable devices, and laptop devices), networked devices, such as servers, switches, routers, hubs, bridges, gateways, modems, repeaters, access points, and/or any other type of computing device that may be running any type of software and/or virtualization technology.

The computer 400 includes a baseboard 402, or "motherboard," which is a printed circuit board to which a multitude of components or devices may be connected by way of a system bus or other electrical communication paths. In one illustrative configuration, one or more central processing units ("CPUs") 404 operate in conjunction with a chipset 406. The CPUs 404 may be standard programmable processors that perform arithmetic and logical operations necessary for the operation of the computer 400.

The CPUs 404 perform operations by transitioning from one discrete physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gateways. These basic switching elements may be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 may provide an interface to a RAM 408 used as the main memory in the computer 400. The chipset 406 may further provide an interface to a computer-readable storage medium, such as a read-only memory ("ROM") 410 or non-volatile RAM ("NVRAM"), for storing basic routines that help to startup the computer 400 and to transfer information between the various components and devices. The ROM 410 or NVRAM may also store other software components necessary for the operation of the computer 400 in accordance with the configurations described herein.

The computer 400 may operate in a networked environment using logical connections to remote computing devices and computer systems through a network, such as the network 130 shown in FIG. 1. The chipset 406 may include functionality for providing network connectivity through a network interface (NIC) 412, such as a gigabit Ethernet adapter. The NIC 412 may connect the computer 400 to other computing devices over the network 424. It should be appreciated that multiple NICs 412 may be present in the computer 400, connecting the computer to other types of networks and remote computer systems.

The computer 400 may be connected to computer-readable media 418 or other forms of storage devices that provide non-volatile storage for the computer 400. The computer-readable media 418 may store an operating system 420, programs 422, and other data. The computer-readable media 418 may be connected to the computer 400 through a storage controller 414 connected to the chipset 406. The computer-readable media 418 may consist of one or more physical storage units. The storage controller 414 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 may store data on the computer-readable media 418 by transforming the physical state of the physical storage units to reflect the information being stored. The specific transformation of the physical state may depend on various factors in different embodiments of this description. Examples of such factors may include, but are not limited to, the technology used to implement the physical storage units, whether the storage device is characterized as primary or secondary storage, and the like.

For example, the computer 400 may store information on the computer-readable media 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 may further read information from the computer-readable media 418 by detecting the physical states or characteristics of one or more locations within the physical storage units.

In addition to the computer-readable media 418 described above, the computer 400 may have access to other computer-readable storage media to store and retrieve information, such as program modules, data structures, or other data. It should be appreciated by those skilled in the art that computer-readable storage media is any available media that provides for the non-transitory storage of data, and which may be accessed by the computer 400. In some examples, the operations performed by the client device, e.g., FIG. 1, 124, edge server, e.g., FIG. 1, 122, and/or any components included therein may be supported by one or more devices similar to computer 400. Unless stated otherwise, some or all the operations performed by the API gateway, and/or any components included therein may be performed by one or more computers 400.

By way of example and not limitation, computer-readable storage media may include volatile and non-volatile, removable and non-removable media, implemented in a method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage, or other magnetic storage devices, or any other medium that may be used to store the desired information in a non-transitory fashion.

As mentioned briefly above, the computer-readable media 418 may store an operating system 420 utilized to control the operation of the computer 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system may comprise the UNIX operating system or one of its variants. It should be appreciated that other operating systems may also be utilized. The computer-readable media 418 may store other system or application programs and data utilized by the computer 400.

In one embodiment, the computer-readable media 418 or other computer-readable storage media is encoded with computer-executable instructions that, when loaded into the computer 400, transform the computer from a general-purpose computing system into a special-purpose computer capable of implementing the embodiments described herein. These computer executable instructions transform the computer 400 by specifying how the CPUs 404 transition between states, as described above. According to one embodiment, the computer 400 has access to computer-readable storage media storing computer-executable instructions that, when executed by the computer 400, perform the various processes described above with regards to FIGS. 1, 2A, 2B, and 3. The computer 400 may also include computer-readable storage media with instructions stored thereon for performing any of the other computer implemented operations described herein.

The computer 400 may also include one or more input/output controllers 416 for receiving and processing input from several input devices, such as a keyboard, a mouse, a touchpad, a touch screen, an electronic stylus, or other types of input device. Similarly, an input/output controller 416 may provide output to a display, such as a computer monitor, a flat panel display, a digital projector, a printer, or another type of output device. It will be appreciated that the computer 400 may not include all the components shown in FIG. 1, may include other components that are not explicitly shown in FIG. 1, or may utilize an architecture completely different than that shown in FIG. 1.

The computer 400 may include one or more hardware processors 404 (CPUs) configured to execute one or more stored instructions. The processor(s) 404 may comprise one or more cores. Further, the computer 400 may include one or more network interfaces 412 configured to provide communications between the computer 400 and other devices. The network interface may include devices configured to couple to personal area networks (PANs), wired and wireless local area networks (LANs), wired and wireless wide area networks (WANs), and so forth. For example, the network interfaces may include devices compatible with Ethernet, WI-FI™, and so forth.

While the disclosure is described with respect to the specific examples, it is to be understood that the scope of the disclosure is not limited to these specific examples. Since other modifications and changes varied to fit particular operating requirements and environments will be apparent to those skilled in the art, the disclosure is not considered limited to the example chosen for purposes of disclosure and covers changes and modifications that do not constitute departures from the true spirit and scope of this disclosure.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed:

1. A method for associating a client device with an edge server, comprising:
    receiving, by each of a plurality of cloud servers, a signal from the client device, requesting a resource provided by the plurality of cloud servers;
    calculating, by each cloud server, a distance between each cloud server and the client device;
    determining, by at least one of the plurality of cloud servers, an approximate location of the client device based on the calculated distance;
    identifying, by the at least one of the plurality of cloud servers, using the approximate location, one or more edge servers that are within a predetermined distance from the client device; and
    communicating, by the at least one of the plurality of cloud servers, the identified one or more edge servers to the client device.

2. The method of claim 1, wherein identifying the one or more edge servers within the predetermined distance comprises ranking each of the one or more edge servers based on a distance from the approximate location of the client device.

3. The method of claim 2, wherein the client device probes a predetermined number of the one or more edge servers with a highest rank to determine which of the one or more edge servers with the highest rank provides a best performance.

4. The method of claim 3, communicating the resource through the one or more edge servers having the best performance to the client device.

5. The method of claim 1, prior to receiving the signal from the client device, further comprising determining, by the at least one of the plurality of cloud servers, a location of each of the one or more edge servers and storing the location in one or more databases associated with the plurality of cloud servers.

6. The method of claim 1, wherein calculating the distance further comprises:
    determining an amount of time the signal takes to be received by each of the plurality of cloud servers; and
    using a known distance the signal can traverse in the amount of time to determine the distance.

7. The method of claim 6, wherein the known distance is calculated based on a distance light travels in a predetermined medium in the amount of time the signal takes to be received.

8. The method of claim 1, wherein the at least one of the plurality of cloud servers is a cloud server that is nearest to the client device.

9. The method of claim 1, wherein the approximate location of the client device is determined by trilateration.

10. The method of claim 1, wherein the resource is a real-time video conferencing application.

11. A system, comprising:
    a client device;
    one or more edge servers; and
    a plurality of cloud servers, each of the plurality of cloud servers comprising:
        one or more processors; and
        one or more computer-readable non-transitory storage media coupled to the one or more of the processors that stores instructions operable when executed by the one or more of the processors to cause the system to perform a method comprising:
            receiving, by each of the plurality of cloud servers, a signal from the client device, requesting a resource provided by the plurality of cloud servers;
            calculating, by each cloud server, a distance between each cloud server and the client device;
            determining, by at least one of the plurality of cloud servers, an approximate location of the client device based on the calculated distance;
            identifying, by the at least one of the plurality of cloud servers, using the approximate location, one or more edge servers that are within a predetermined distance from the client device; and
            communicating, by the at least one of the plurality of cloud servers, the identified one or more edge servers to the client device.

12. The system of claim 11, wherein identifying the one or more edge servers within the predetermined distance comprises ranking each of the one or more edge servers based on a distance from the approximate location of the client device.

13. The system of claim 12, wherein the client device probes a predetermined number of the one or more edge servers with a highest rank to determine which of the one or more edge servers with the highest rank provides a best performance.

14. The system of claim 13, communicating the resource through the one or more edge servers having the best performance to the client device.

15. The system of claim 11, prior to receiving the signal from the client device, further comprising determining, by the at least one of the plurality of cloud servers, a location of each of the one or more edge servers and storing the location in one or more databases associated with the plurality of cloud servers.

16. The system of claim 11, wherein calculating the distance further comprises:
    determining an amount of time the signal takes to be received by each of the plurality of cloud servers; and
    using a known distance the signal can traverse in the amount of time to determine the distance.

17. The system of claim 16, wherein the known distance is calculated based on a distance light travels in a predetermined medium in the amount of time the signal takes to be received.

18. The system of claim 11, wherein the at least one of the plurality of cloud servers is a cloud server that is nearest to the client device.

19. The system of claim 11, wherein the approximate location of the client device is determined by trilateration.

20. At least one non-transitory computer-readable storage medium having stored therein instructions which, when executed by one or more processors, cause the one or more processors to:
    receive, by each of a plurality of cloud servers, a signal from a client device, requesting a resource provided by the plurality of cloud servers;
    calculate, by each cloud server, a distance between each cloud server and the client device;
    determine, by at least one of the plurality of cloud servers, an approximate location of the client device based on the calculated distance;
    identifying, by the at least one of the plurality of cloud servers, using the approximate location, one or more edge servers that are within a predetermined distance from the client device; and communicate, by the at least one of the plurality of cloud servers, the identified one or more edge servers to the client device.

\* \* \* \* \*